(12) United States Patent
Wernicke et al.

(10) Patent No.: US 7,775,773 B2
(45) Date of Patent: Aug. 17, 2010

(54) STRUCTURAL MEMBER FOR MANUFACTURING A TOWER OF A WIND TURBINE

(75) Inventors: Jens-Thomas Wernicke, Munster (DE); Huub Gierveld, Losser (NL)

(73) Assignee: General Electric Company, Schenectady, NY (US)

( * ) Notice: Subject to any disclaimer, the term of this patent is extended or adjusted under 35 U.S.C. 154(b) by 1209 days.

(21) Appl. No.: 10/493,908

(22) PCT Filed: Oct. 24, 2002

(86) PCT No.: PCT/EP02/11914

§ 371 (c)(1),
(2), (4) Date: Jan. 30, 2007

(87) PCT Pub. No.: WO03/036085

PCT Pub. Date: May 1, 2003

(65) Prior Publication Data

US 2007/0148004 A1 Jun. 28, 2007

(30) Foreign Application Priority Data

Oct. 24, 2001 (DE) .............................. 101 52 550

(51) Int. Cl.
*F03D 11/04* (2006.01)
(52) U.S. Cl. ...................... 416/244 R; 52/40
(58) Field of Classification Search ............ 416/244 R; 415/4.3, 4.5, 908; 52/831, 834, 843, 40, 52/745.18, 782.1, 204.1, 848
See application file for complete search history.

(56) References Cited

U.S. PATENT DOCUMENTS

| 3,550,637 | A |   | 12/1970 | Briden |
|---|---|---|---|---|
| 4,561,476 | A | * | 12/1985 | Bunkoczy ............... 141/311 R |
| 5,203,672 | A | * | 4/1993 | Wolf ......................... 415/2.1 |
| 5,847,318 | A |   | 12/1998 | Chapman |
| 6,467,233 | B1 | * | 10/2002 | Maliszewski et al. ......... 52/831 |
| 2006/0225379 | A1 | * | 10/2006 | Seidel et al. ............... 52/726.3 |

FOREIGN PATENT DOCUMENTS

| DE | 91 03 998 U | 6/1991 |
|---|---|---|
| EP | 0 414 284 A | 2/1991 |

OTHER PUBLICATIONS

Wernicke, R., "Lukenecken Aus Stahlguss", Schiff Und Hafen, Mar. 3, 1999, pp. 61-64, vol. 51, No. 3.
PCT International Search Report for PCT Patent Application No. PCT/EP02/11914, Jul. 2, 2003, 6 pages.

* cited by examiner

*Primary Examiner*—Ninh H Nguyen
(74) *Attorney, Agent, or Firm*—Blakely, Sokoloff, Taylor & Zafman LLP

(57) ABSTRACT

The invention relates to a structural member for manufacturing a tower of a wind power system having a delimitation surface forming a portion of the outer surface of the tower and comprising a through opening provided for accommodating a door, whereby at least a region of the structural member (30) comprising the through opening (20) is at least partially formed as a cast part consisting of a preferably weldable casting material.

8 Claims, 2 Drawing Sheets

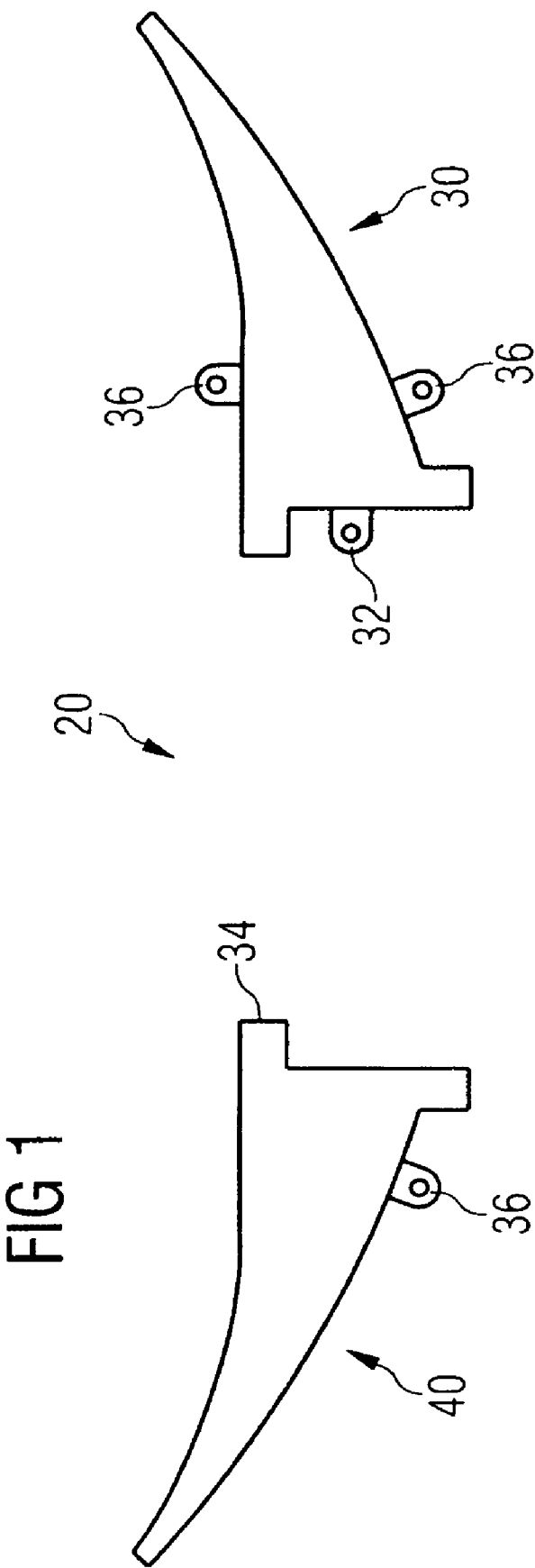

STRUCTURAL MEMBER FOR MANUFACTURING A TOWER OF A WIND TURBINE

The invention relates to a structural member for manufacturing a tower of a wind power system having a delimitation surface forming a portion of the outer surface of the tower and comprising a through opening provided for accommodating a door.

Conventional wind power systems comprise a tower which is firmly anchored on the ground, a machine gondola pivoted thereon at the top of the tower about a vertical axis of rotation, as well as a rotor rotatably mounted on the gondola about a substantially horizontal rotor axis and including at least one rotor blade.

In modern wind power systems with a nominal power of more than one megawatt, tower heights of 100 m or more and rotor diameters of at least 70 m are achieved. For maintenance of such systems, the tower having generally a diameter of more than three meters has to be accessible from inside so that the parts in the region of the rotor axis which require maintenance can be reached without danger and without any substantial expenditure.

For this purpose, a through opening which can be locked with a door is generally provided at the foot of the tower consisting usually of rolled steel plates having a thickness of up to 40 mm. In order to form said through opening, a corresponding hole is cut into the steel jacket of the tower, and a door case provided for accommodating the door is welded into said hole.

Figure 2A:
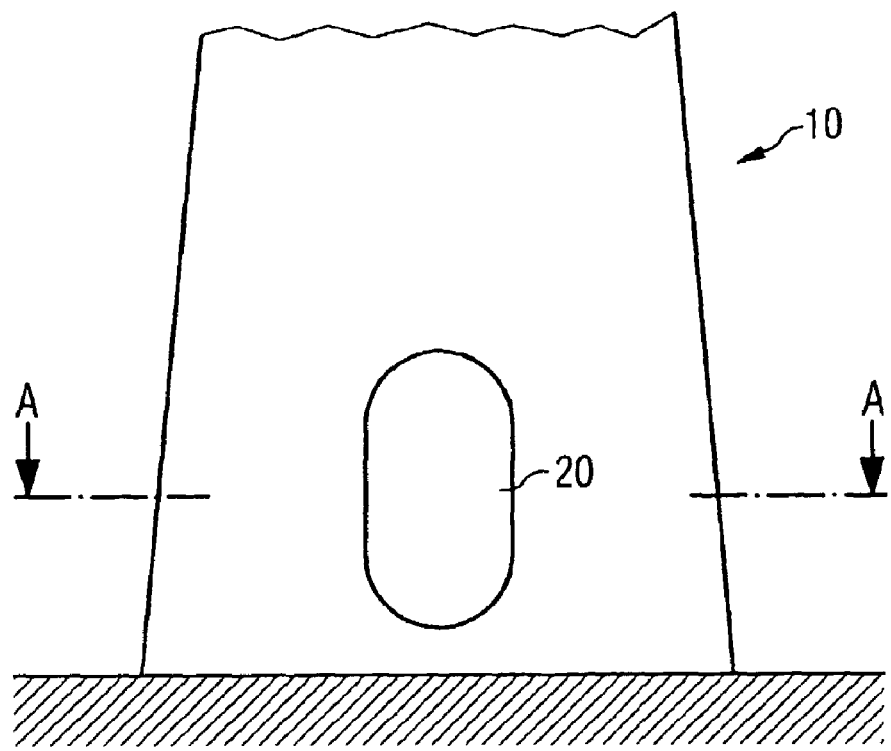
Figure 2B:
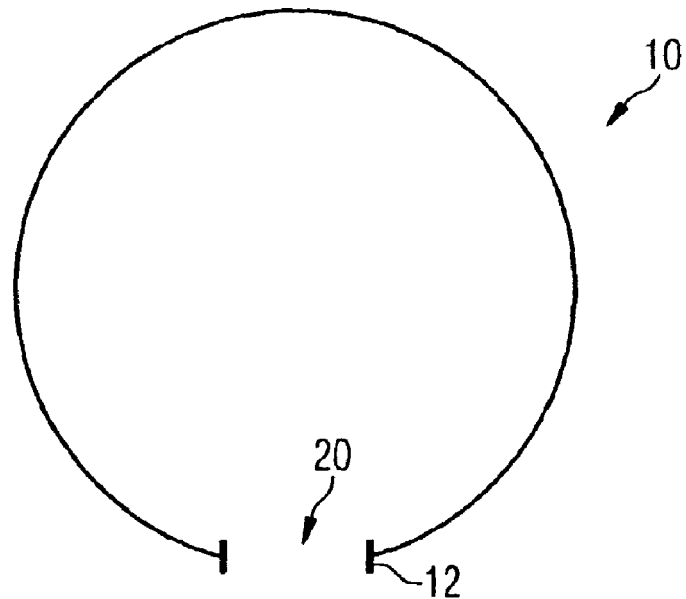

In this process, the tower is weakened not only by the formation of the hole in the jacket surface, but also by the subsequent welding process because, by the effect of heat, structural changes in the steel plate parts are caused thereby. With the help of computer simulations, it has been shown that, of the entire tower construction, the region of the through opening is the part which is stressed most in the case of high wind loads, and, therefore, correspondingly high material strengths or additional reinforcement members have to be used in this region in order to guarantee sufficient stability of the tower construction. A conventional tower construction of the kind just described is shown by way of example in FIG. 2. Therein, FIG. 2a shows a view of the lower part of said tower construction, and FIG. 2b a sectional view taken along cutting plane A-A. In the drawing, reference number 10 refers to the tower, reference number 20 to the through opening and reference number 12 refers to the case welded into the through opening. The above-mentioned computer simulations have shown that weak points particularly occur in the region of the welded transition section between the case 12 and the jacket surface of tower 10 adjacent thereto. To eliminate this problem, it has been proposed to manufacture the through opening 20 as an oval opening, avoiding sharp corners, as indicated in FIG. 2a. However, even by means of said construction, weak points in the region of the transition section between the case 12 and the jacket surface of the tower adjacent thereto cannot be eliminated completely, so that, even with this measure, the attachment of additional reinforcing members and/or the increasing of the material strength of the steel plates used for forming the jacket surface is unavoidable.

With respect to the problems of the prior art which have been described above, the object of the invention is to provide a structural member of the type described at the beginning, which can be manufactured and assembled at low costs, and wherein weak points in the tower construction which cannot be tolerated are avoided.

According to the invention, said problem is solved by a development of the known structural members, which is substantially characterized in that at least a region of the structural member comprising the through opening is at least partially formed as a cast part consisting of a preferably weldable casting material such as cast steel.

This invention is based on the realization that the observed weakening of the tower construction is primarily caused by the welding process in the region of the through opening required for the manufacture of conventional structural members of the type described at the beginning, and that said welding process can be avoided if the through opening is realized by using a cast part because, by proper selection of the casting mold, such cast parts can be prefabricated in such a way that it is substantially not required to attach additional members later. It was especially realized therein that the increase in stability achieved by avoiding additional weld seams by far outweighs the known disadvantage related to the use of casting materials with respect to the limited ductility, and, therefore, despite said disadvantages of casting materials, altogether, an increase in stability of the tower of a wind power system can be achieved without the use of additional reinforcement members and/or an increase in the wall strength of the tower construction.

Thereby, a substantial reduction with respect to costs is achieved, while the required stability is guaranteed at the same time, because the material used, the manufacturing time, the required personnel used and the strength design can be optimized using few structural members in the manufacturing process and higher manufacturing tolerances.

Within the scope of this invention, the use of structural members entirely consisting of a casting material is considered, which are connected to other component parts of the tower during a pre-assembly and/or during the final assembly. In a particularly preferred embodiment of the invention, however, the structural member is already designed as a pre-assembled component having at least one steel plate adjacent to the cast part and preferably welded thereto.

In view of the commonly used tower geometries, the delimitation surface of the structural member according to the invention advantageously has substantially the form of a surface area of a circular cylinder or of a section thereof. The connection between a cast part and a steel plate of a structural member of the invention designed as a pre-assembled component is advantageously effected by a butt seam. In view of the wall thickness of more than 10 mm of the steel plates used for the manufacture of conventional towers of wind power systems, in order to obtain a sufficiently strong weld joint, it is usually required that the weld seam is formed in a joint having a wedge-shaped cross-section formed between the cast part and the steel plate. In such a joint, proceeding from the region having the smallest width, a number of welding beads can be laid successively, which will finally completely fill the joint. If structural members of the invention are used, the V-shaped chamfering required for forming such a joint having a wedge-shaped cross-section can be integrated into the cast part already during the manufacture of the cast part by suitably selecting the casting mold.

As already explained at the beginning, an increase in stability can also be achieved by avoiding sharp corners or the like in the formation of the through opening. For this reason, the through opening of structural members according to the invention thus preferably shows substantially an oval shape.

In wind power systems, in the region of the through opening, usually further functional elements have to be provided such as the door case for attaching a door leaf in an articulated manner, fastening elements for fire extinguishers or the like, antenna holders, suction pipes and/or exhaust pipes for an emergency power generating unit provided with a diesel engine, an accommodation for a stair railing, an orifice or an exhaust opening for the cooling or fresh air supply and/or a safety device for the door. In conventional towers of wind power systems, said functional elements are welded to the tower jacket. This causes additional weakened points in the tower jacket. If structural members according to the invention are used, said problem can be solved by casting at least one of the additional functional elements together with the cast part as an integral part thereof.

In the following, the invention is explained with reference to the drawing; with respect to any details which are essential for the invention and which have not further been emphasized in the description, reference is explicitly made to said drawing. In the drawing, FIG. 1 shows a sectional view of a structural member according to the invention, and FIG. 2 shows the tower of a wind power system of the prior art.

In FIG. 1, a structural member of the invention forming a through opening 20 of the type shown in FIG. 2 is shown. Said structural member is a cast part manufactured from cast steel and comprises a fastening element 32 for attaching a door leaf in an articulated manner, a door leaf stop 34 and altogether three fastening elements 36, which can be used as holders for fire extinguishers, antenna holders and/or door safety devices. The structural member shown in FIG. 2 has an outer delimitation surface in the form of a section of a surface area of a truncated cone. For assembling a tower of a wind power system, said structural member is welded together with further structural members formed in the form of rolled steel plates in order to manufacture a tower for the wind power system in this manner. In the embodiment of the invention shown in FIG. 1, the through opening is formed such that it has the size of a conventional door (standard door).

The invention is not limited to the embodiment explained by means of the drawing. For example, also the use of structural members is considered where only part of the through opening is limited by the cast part, and the rest of the through opening is limited by a rolled steel plate. Furthermore, also the use of structural members according to the invention having delimitation surfaces having the shape of a surface of a circular cylinder and/or plane delimitation surfaces is considered. Moreover, further functional elements can be provided at the cast part of the structural member according to the invention.

The invention claimed is:

1. A structural member for manufacturing a tower of a wind power system the structural member comprising:
   a delimitation surface forming a portion of an outer surface of a wall of the tower;
   a through opening disposed on the delimitation surface for accommodating a door, the through opening having a first edge and a second edge opposite to the first edge;
   a fastening member disposed on the first edge for attaching the door; and
   a door leaf stop disposed on the second edge for stopping the door when the door is at a closed position,
   wherein at least a region surrounding the through opening is at least partially formed as a cast part consisting of a weldable casting material, and wherein the fastening member and the door leaf stop are integrally attached as part of the cast part.

2. The structural member according to claim 1, wherein at least one steel plate is adjacent to the cast part and welded therewith.

3. The structural member according to claim 2 wherein the weld seam is formed in a joint having a wedge-shaped cross-section formed between the cast part and the steel plate.

4. The structural member according to claim 1, wherein the delimitation surface has substantially the form of a surface area of a circular cylinder, a surface area of a truncated cone or of a section thereof.

5. The structural member according to claim 1, wherein the through opening substantially shows an oval shape.

6. The structural member according to claim 1, wherein the cast part comprises at least one functional element as an integral component part.

7. The structural member according to claim 6, wherein the functional element is a door case, a door journal, a fastening element for a fire extinguisher, an antenna holder, a suction pipe and/or exhaust pipe for an emergency power generating unit, an accommodation for a stair railing, a vent hole and/or a door safety device.

8. A wind power system comprising a structural member according to claim 1.

* * * * *